Jan. 22, 1929.
J. A. LAMPMAN
1,699,741
DEVICE FOR CONTROLLING SHIELDS
Filed Aug. 8, 1927
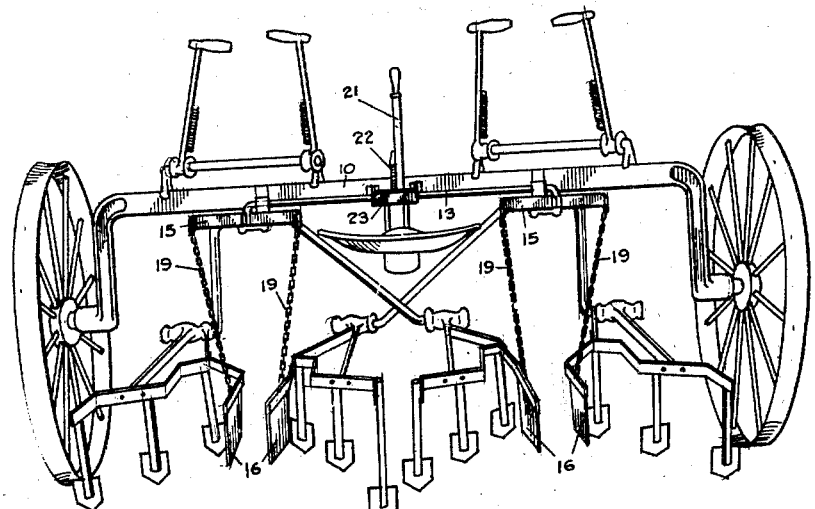
Fig. 2
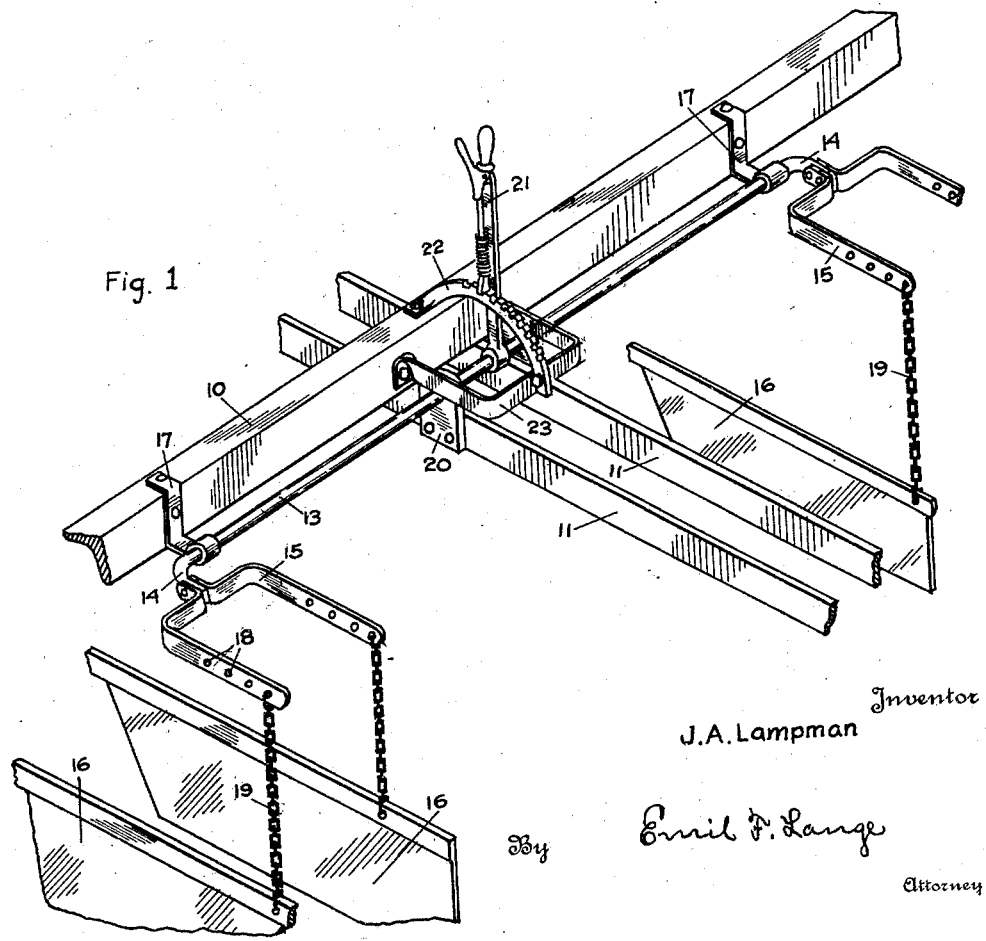
Inventor
J. A. Lampman
By Emil F. Lange
Attorney Patented Jan. 22, 1929.

1,699,741

UNITED STATES PATENT OFFICE.

JOHN A. LAMPMAN, OF SPENCER, NEBRASKA.

DEVICE FOR CONTROLLING SHIELDS.

Application filed August 8, 1927. Serial No. 211,444.

My invention relates to devices for controlling the shields of cultivators and its primary object is the provision of a device whereby the shields of a cultivator may be quickly raised or lowered by means of a lever which is positioned within convenient reach of the driver.

An important object of my invention is the provision of a device of the kind specified which is in the nature of an attachment and which is so designed that it may be applied to any of the cultivators at present in use on farms and requiring no especial skill in attaching or detaching the device.

A third object of the invention is the provision of a shield controlling device of exceedingly simple construction so that the device may be produced at low cost and so that it may be manipulated with the greatest possible ease.

Having in view these objects and others which will be pointed out in the following description, I will now refer to the drawings, in which Figure 1 is a view in perspective of the device for controlling shields and showing its relation to the shields and to the cultivator frame.

Figure 2 is a rear elevational view of a cultivator which is equipped with my device for controlling the shields.

The cultivator frame is represented in Figure 1 by the transverse beam 10 and the longitudinal beams 11, both of which are employed as supports for my attachment. The device itself includes a shaft 13 having rearwardly projecting end portions 14 which are connected through forks 15 with the shields 16, the shields being a part of the cultivator construction. The shaft 13 may be made from steel shafting or from tubing. It is journalled in brackets 17 having turned collars at their rear extremities. These brackets 17 are made preferably by bending metal straps into Z shape and then turning one end portion so as to provide a bearing for the shaft 13. The other end portion of the bracket 17 as well as the intermediate portion are provided with apertures whereby the brackets may be secured to the beam 10 of the cultivator frame.

The extremities of the rearwardly projecting end portions 14 are preferably flattened in vertical direction. The forks 15 are each made of two parts having L shape and the parts are secured as shown in Figure 1 to the flattened end portions of the arms 14. They may be secured by welding, riveting or bolting or in any other desirable manner. The arms of the forks 15 project rearwardly and are each provided with apertures 18 for receiving the upper ends of the chains 19 which are secured at their lower ends to the shields 16. The rocking of the shaft 13 will, of course, cause the arms of the forks 15 to move angularly, the distance of the arcuate movement increasing toward their extremities. It is therefore apparent that the chains 19 may be adjustably secured through the apertures 18 so as to vary the length of movement of the chains 19 and consequently of the shields 16.

The shaft 13 is journalled as shown in the collars of the brackets 17. The length of this shaft is, however, so great that it is desirable in most cases to provide additional bearings. Such bearings are provided in the brackets 20 which may be bolted or otherwise secured to the beams 11 in a manner such that their bearings will be in alignment with the bearings of the brackets 17.

To be effective the device must be provided with means for conveniently rocking the shaft 13 and with means for releasably latching the device in any desired position of the shields 16. The shaft is therefore provided with a hand lever 21 which is rigidly secured at its lower end to the shaft 13, the upper end of the hand lever 21 being positioned conveniently with reference to the driver's seat. The hand lever 21 is equipped with the usual pawl device which cooperates with the rack 22. The rack 22 is secured at its forward end to the beam 10 and at its rear end to the rearwardly projecting bracket 23. The bracket 23 is U shaped and is secured at its extremities to the beam 10. It serves primarily as a support for the rear end of the rack 22.

The cultivators now on the market are provided with shields which prevent injury to the growing corn by protecting the corn from the cultivator shovels and from the clods of dirt which are thrown by the cultivator shovels in the direction of the corn row. In most of these implements there is provided a means for adjusting the height of the shields so that this height may be successively increased in later cultivations. The adjusting mechanism is more or less inaccessible and requires that the operator leave his seat and that he make the adjustments by means of a wrench or other tool. Such cultivators are designed on the assumption that the standing corn is of a uniform height during each cultivation. They do not take into consideration the fact that the corn in a single row often varies between extremely wide limits due to differences in the texture and quality of the soil. Without my attachment the driver must disregard these differences in the height of the corn and he must adjust his shields to a medium height and then take chances on destroying many of the plants. Any other course is impracticable since it would involve too great a waste of time to adjust the shields with every variation of height in the corn rows. With my device, however, the driver, when he sees a variation in height ahead of him may manipulate the lever 21 without special effort and bring the shields to the most desirable height for the corn which he is passing over.

It should be noted that the device is intended primarily as an attachment which may be purchased by farmers to be secured to the cultivators which they already own. The construction and design of the attachment are such that the attachment may be secured to cultivators by merely the use of a wrench and without requiring any special mechanical skill or any skill other than is possessed by the usual run of hired farm laborers.

Having thus described my invention in such full, clear, and exact terms that its construction and operation will be readily understood by others skilled in the art to which it pertains, what I claim as new and desire to secure by Letters Patent of the United States is:

1. An attachment for cultivators having a transverse beam and a longitudinally positioned beam projecting rearwardly therefrom and having also two pairs of vertically positioned fender members for straddling two parallel rows of crops, said attachment including a pair of Z-shaped brackets adapted to be releasably secured to the transverse beam of the cultivator and terminating in bearing members in the rear of the transverse beam of the cultivator, a second pair of bearing members adapted to be releasably secured to the rearwardly projecting beam of the cultivator to project upwardly therefrom, a rock shaft journalled in all of said bearing members, rearwardly projecting arms at the extremities of said rock shaft, said arms being adapted to be flexibly connected to the fender members of the cultivator, and means for manually rocking said rock shaft.

2. An attachment for cultivators having a transverse beam and a longitudinally positioned beam projecting rearwardly therefrom and having also two pairs of vertically positioned fender members for straddling two parallel rows of crops, said attachment including a pair of Z-shaped brackets adapted to be releasably secured to the transverse beam of the cultivator and having bearing members rearward of the transverse beam of the cultivator, a U-shaped bracket adapted to be releasably secured to the transverse beam of the cultivator to project rearwardly therefrom, a rock shaft passing through both of said bearing members and terminating at its extremities in rearwardly projecting forks, a lever secured to said rock shaft and passing upwardly through said U-shaped bracket, an arcuate rack secured at its rear extremity to said U-shaped bracket and adapted to be releasably secured at its forward extremity to the transverse beam of the cultivator, a pawl on said lever for engaging said rack, and flexible means for connecting said forks to the fender members of the cultivator.

In testimony whereof I affix my signature.

JOHN A. LAMPMAN.